United States Patent
Ortelt et al.

(10) Patent No.: US 9,676,898 B2
(45) Date of Patent: Jun. 13, 2017

(54) CURABLE COMPOSITIONS BASED ON EPOXY RESINS WITHOUT BENZYL ALCOHOL

(71) Applicants: Martina Ortelt, Duelmen (DE); Emmanouil Spyrou, Schermbeck (DE); Jan Christoph Pfeffer, Hanau (DE); Dirk Fuchsmann, Haltern am See (DE); Britta Kohlstruk, Gladbeck (DE); Thomas Haas, Muenster (DE)

(72) Inventors: Martina Ortelt, Duelmen (DE); Emmanouil Spyrou, Schermbeck (DE); Jan Christoph Pfeffer, Hanau (DE); Dirk Fuchsmann, Haltern am See (DE); Britta Kohlstruk, Gladbeck (DE); Thomas Haas, Muenster (DE)

(73) Assignee: Evonik Degussa GmbH, Essen (DE)

( * ) Notice: Subject to any disclaimer, the term of this patent is extended or adjusted under 35 U.S.C. 154(b) by 99 days.

(21) Appl. No.: 14/425,180

(22) PCT Filed: Aug. 21, 2013

(86) PCT No.: PCT/EP2013/067386
§ 371 (c)(1),
(2) Date: Mar. 2, 2015

(87) PCT Pub. No.: WO2014/037222
PCT Pub. Date: Mar. 13, 2014

(65) Prior Publication Data
US 2015/0203629 A1    Jul. 23, 2015

(30) Foreign Application Priority Data
Sep. 7, 2012  (EP) .................... 12183423

(51) Int. Cl.
C08G 59/50    (2006.01)
C09D 163/00   (2006.01)
C08K 5/1535   (2006.01)
C08G 59/24    (2006.01)

(52) U.S. Cl.
CPC ....... *C08G 59/5046* (2013.01); *C08G 59/245* (2013.01); *C08G 59/504* (2013.01); *C08K 5/1535* (2013.01); *C09D 163/00* (2013.01); *Y10T 428/31511* (2015.04); *Y10T 428/31529* (2015.04)

(58) Field of Classification Search
USPC ................... 428/413, 414; 523/428
See application file for complete search history.

(56) References Cited

U.S. PATENT DOCUMENTS 3,055,914 A   9/1962  Garber et al.
4,639,493 A   1/1987  Dickie et al.
7,923,225 B2  4/2011  Mueller et al.
8,349,596 B2  1/2013  Mueller et al.
8,703,451 B2  4/2014  Haas et al.
8,779,036 B2  7/2014  Spyrou et al.
8,999,684 B2  4/2015  Poetter et al.
9,012,227 B2  4/2015  Karau et al.
2008/0027169 A1  1/2008  Ortelt
2011/0118433 A1  5/2011  Pötter et al.
2011/0171702 A1  7/2011  Reinecke et al.
2011/0281117 A1 11/2011  Ortelt et al.
2012/0034665 A1  2/2012  Haas et al.
2012/0115988 A1  5/2012  Spyrou et al.
2013/0052700 A1  2/2013  Poetter et al.
2013/0164797 A1  6/2013  Gielen et al.
2014/0178948 A1  6/2014  Schaffer et al.
2014/0186905 A1  7/2014  Schaffer et al.
2014/0242646 A1  8/2014  Pötter et al.
2014/0256904 A1  9/2014  Schaffer et al.
2014/0308717 A1 10/2014  Haas et al.
2015/0010968 A1  1/2015  Engel et al.

(Continued)

FOREIGN PATENT DOCUMENTS

GB    911221 A    11/1962
GB    1 019 925   2/1966

OTHER PUBLICATIONS

U.S. Appl. No. 14/653,307, filed Jun. 17, 2015, Spyrou, et al.
"Epon™ Resin 828" RP: 3075 Hexion™ Specialty Chemicals, Re-issued: Sep. 2005, 8 Pages.
"Epikure™ Curing Agent 3230" Hexion Technical Data Sheet, Re-issued: Aug. 2007, 4 Pages.
Ha Q. Pham, et al., "Epoxy Resins" Ullmann'S Encyclopedia of Industrial Chemistry, vol. 13, 2012, 15 Pages.

(Continued)

*Primary Examiner* — Tae H Yoon
(74) *Attorney, Agent, or Firm* — Oblon, McClelland, Maier & Neustadt, L.L.P.

(57) ABSTRACT

The invention relates to curable compositions comprising at least one epoxy resin and at least one hardener wherein the hardener is a compound of formula (I) or (II)

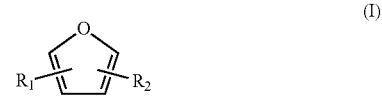

(I)

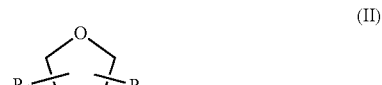

(II)

where $R_1$ and $R_2$ are each independently selected from the group of substituents having the formula $-(CH_2)_x-NH_2$ and x is in each case independently 0, 1, 2, 3 or 4, to surfaces comprising such compositions, to methods comprising applying a coating material comprising such compositions and to the use of such compositions as surface protection.

19 Claims, No Drawings

(56) References Cited

U.S. PATENT DOCUMENTS

| | | |
|---|---|---|
| 2015/0044744 A1 | 2/2015 | Pfeffer et al. |
| 2015/0099282 A1 | 4/2015 | Haas et al. |
| 2015/0111253 A1 | 4/2015 | Schaffer et al. |
| 2015/0111254 A1 | 4/2015 | Hennemann et al. |

OTHER PUBLICATIONS

U.S. Appl. No. 14/763,378, filed Jul. 24, 2015, Haas, et al.
U.S. Appl. No. 14/766,226, filed Aug. 6, 2015, Ortelt, et al.
U.S. Appl. No. 14/363,178, filed Jun. 5, 2014, Haas, et al.
U.S. Appl. No. 14/400,379, filed Nov. 11, 2014, Haas, et al.
U.S. Appl. No. 14/380,483, filed Aug. 22, 2014, Schiemann, et al.
U.S. Appl. No. 14/367,610, filed Jun. 20, 2014, Haas, et al.
U.S. Appl. No. 14/405,050, filed Dec. 2, 2014, Haas, et al.
U.S. Appl. No. 14/435,339, filed Apr. 13, 2015, Engel, et al.
He X., et al., "Evaluation of Furfurylamines as Curing Agents for Epoxy Resins", Journal of Polymer Science: Part A: Polymer Chemistry Edition, vol. 30, No. 4, (Mar. 30, 1992), pp. 533-542.
International Search Report Issued May 8, 2014 in PCT/EP2013/067386 Filed Aug. 21, 2013.

CURABLE COMPOSITIONS BASED ON EPOXY RESINS WITHOUT BENZYL ALCOHOL

This application is a 35 U.S.C. 371 national phase of International Application No. PCT/EP13/67386, filed on Aug. 21, 2013, which claims priority from EP12183423, filed on Sep. 7, 2012. The entire disclosures of each of these applications are incorporated herein by reference in their entirety for all purposes.

The invention relates to curable compositions comprising at least one epoxy resin and at least one hardener wherein the hardener is a compound of formula (I) or (II)

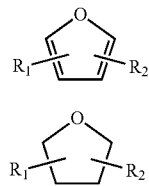

where $R_1$ and $R_2$ are each independently selected from the group of substituents having the formula —$(CH_2)_x$—$NH_2$ and x is in each case independently 0, 1, 2, 3 or 4, to surfaces comprising such compositions, to methods comprising applying a coating material comprising such compositions and to the use of such compositions as surface protection.

Epoxy resins are prepolymers comprising two or more epoxy groups per molecule. The reaction of these resins with a range of hardeners affords crosslinked polymers. These polymers may be thermosets and may be used in the fields of civil engineering, particularly in industrial floors, sealing systems and concrete maintenance and repair products, fibre composites, potting compositions, paints/varnishes and adhesives for example. An overview of resins and hardeners, including their properties, and the use thereof in the field of civil engineering may be found in H. Schuhmann, "Handbuch Betonschutz durch Beschichtungen" [Handbook of concrete protection using coatings], Expert Verlag 1992, pp. 396-428. The use of resins and hardeners in the field of fibre composites is described in P. K. Mallick, "Fiber-Reinforced Composites, Materials, Manufacturing, and Design", CRC Press, pp. 60-76.

In addition to epoxy resins, amines and other compounds involved in the crosslinking reaction, industrially relevant compositions of this type typically also comprise nonreactive components as auxiliaries. Although said nonreactive components are not covalently incorporated, it must be assumed that a certain proportion thereof remains in the composition once curing has completed and is continuously released into the environment over a long period of time. Said nonreactive components may therefore contribute to indoor pollution.

Benzyl alcohol is a typical nonreactive component of curable epoxy-containing compositions. Benzyl alcohol is miscible with the reactive components and acts as a diluent, as a viscosity reducer and thus as a flow promoter. Benzyl alcohol also catalyses the curing reaction.

Against the background of the classification of benzyl alcohol as a VOC (volatile organic compound) by the EU decopaint directive there is, however, a need to develop epoxy systems that do not require benzyl alcohol.

The problem addressed by the present invention is accordingly that of developing amine hardeners for epoxy resins to obtain formulations that cure sufficiently at ambient temperatures with very small quantities of benzyl alcohol and preferably without the use of benzyl alcohol.

A further problem addressed by the invention is that of providing a curable epoxy resin-based composition while retaining individual processing-relevant properties or the entirety of the processing-relevant properties such as very low initial viscosity, sufficiently high hardnesses and a high conversion over a period of from one to seven days at room temperature and avoiding any detrimental effects on through-curing compared to comparable compositions comprising benzyl alcohol.

These and further problems are solved by the subject-matter of the present application and in particular also by the subject-matter of the accompanying independent claims, the dependent claims specifying embodiments of the invention.

The problem addressed by the invention is solved in a first aspect by a curable composition comprising at least one epoxy resin and at least one hardener wherein the hardener is a compound of formula (I) or (II)

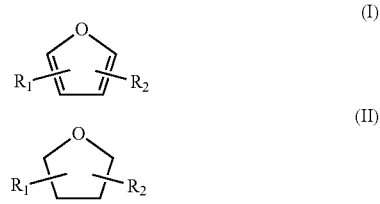

where $R_1$ and $R_2$ are each independently selected from the group of substituents having the formula —$(CH_2)_x$—$NH_2$ and x is in each case independently 0, 1, 2, 3 or 4.

In a first embodiment of the first aspect, the problem is solved by a composition where x in $R_1$ and $R_2$ is 1.

In a second embodiment of the first aspect, which is also an embodiment of the first embodiment, the problem is solved by a composition wherein the hardener is 5-aminomethyl-2-furfurylamine (HMF diamine).

In a third embodiment of the first aspect, which is also an embodiment of the first to second embodiments, the problem is solved by a composition wherein the epoxy resin is selected from the group comprising epoxy resins based on bisphenol A diglycidyl ether, bisphenol F diglycidyl ether and cycloaliphatic types.

In a fourth embodiment of the first aspect, which is also an embodiment of the first to third embodiments, the problem is solved by a composition wherein the composition comprises less than 20 g of benzyl alcohol per 100 g of the entirety of all hardeners comprised therein.

In a fifth embodiment of the first aspect, which is also an embodiment of the first to fourth embodiments, the problem is solved by a composition wherein the composition comprises less than 4 wt % of benzyl alcohol.

In a sixth embodiment of the first aspect, which is also an embodiment of the first to fifth embodiments, the problem is solved by a composition wherein the composition comprises no benzyl alcohol.

In a seventh embodiment of the first aspect, which is also an embodiment of the first to sixth embodiments, the problem is solved by a composition wherein the stoichiometric ratio of the entirety of all epoxy resins comprised in the composition to the entirety of all hardeners comprised in the composition is from 0.7 to 1.3.

In an eighth embodiment of the first aspect, which is also an embodiment of the first to seventh embodiments, the problem is solved by a composition wherein the stoichiometric ratio of the entirety of all epoxy resins comprised in the composition to the entirety of all hardeners comprised in the composition is from 0.9 to 1.1.

In a ninth embodiment of the first aspect, which is also an embodiment of the first to eighth embodiments, the problem is solved by a composition wherein the composition comprises at least one further hardener comprising at least two or more primary and/or secondary amine groups, preferably a hardener selected from the group of hardeners comprising methylenedianiline, N-aminoethylpiperazine, isophoronediamine, m-phenylenebis(methylamine), trimethylhexamethylenediamine, polyoxyalkyleneamines, polyaminoamides and reaction products of amines with acrylonitrile and Mannich bases.

In a tenth embodiment of the first aspect, which is also an embodiment of the first to ninth embodiments, the problem is solved by a composition further comprising at least one reaction accelerant, preferably selected from the group consisting of organic acids and tertiary amines.

In an eleventh embodiment of the first aspect, which is also an embodiment of the first to tenth embodiments, the problem is solved by a composition further comprising at least one reactive diluent, preferably selected from the group consisting of mono- and polyfunctional epoxy compounds liquid at room temperature.

In a twelfth embodiment of the first aspect, which is also an embodiment of the first to eleventh embodiments, the problem is solved by a composition according to any of claims 1 to 13 further comprising pigments, fillers and/or additives.

In a second aspect, the problem addressed by the invention is solved by a surface preferably comprising metal, mineral substrate, plastic, paint/varnish, polymer concrete, adhesive, fibre composite, potting composition or impregnation and coated with the composition according to the invention.

In a third aspect, the problem addressed by the invention is solved by a method of coating a surface comprising applying to the surface the coating material comprising the composition according to the first aspect or an embodiment thereof.

In a first embodiment of the third aspect, the problem is solved by a method wherein the surface is a surface comprising metal, mineral substrate, plastic, paint/varnish, polymer concrete, adhesive, fibre composite, potting composition or an impregnation.

In a fourth aspect, the problem addressed by the invention is solved by the use of the composition according to the first aspect or an embodiment thereof as surface protection on metal, mineral substrate, plastic, paint/varnish, polymer concrete, adhesive, fibre composite, potting composition or as an impregnation.

In a fifth aspect, the problem addressed by the invention is solved by a composition obtainable by curing the curable composition according to the first aspect or an embodiment of the first aspect.

The invention is based on the surprising discovery that curable compositions without benzyl alcohol according to the invention exhibit processing-relevant properties which are equivalent to or even improved over comparable prior art compositions comprising benzyl alcohol.

It is first of all essential for the curable composition of the invention, comprising at least one epoxide, to comprise at least one hardener, said hardener being a compound of formula (I) or (II),

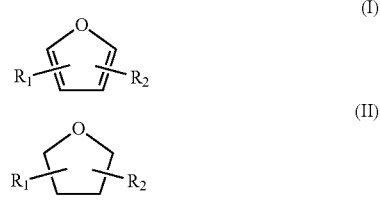

where $R_1$ and $R_2$ are each independently selected from the group of substitutents having the formula $-(CH_2)_x-NH_2$ and x is in each case independently 0, 1, 2, 3 or 4. In one preferred embodiment, $R_1$ is at position 1 of the ring, i.e., it is covalently bonded to a carbon atom which is comprised in the five-membered ring and which itself is covalently bonded to the ring system oxygen atom by a C—O single bond. In one particularly preferred embodiment, $R_1$ is at position 1 of the ring and $R_2$ is at position 2, 3 or preferably at either of positions 3 and 4. In one preferred embodiment, the composition comprises, in addition to this hardener, at least one further hardener which may be a further compound of formula (I) or (II) or else preferably at least one hardener other than a hardener according to formula (I) or (II).

Useful other hardeners include all hardeners described in the prior art as useful for curable compositions comprising at least one epoxide, in particular amine-containing hardeners bearing at least two or more primary and/or secondary amino groups, for example diethylenetriamine, triethylenetetramine, methylenedianiline, bis(aminocyclohexyl)methane, 3,3'-dimethyl-4,4'-diaminodicyclohexylmethane, tricyclododecanediamine, norbornanediamine, N-aminoethylpiperazine, isophoronediamine, m-phenylenebis(methylamine), 1,3- and/or 1,4-bis(aminomethyl)cyclohexane, trimethylhexamethylenediamine, polyoxyalkyleneamines, polyaminoamides and reaction products of amines with acrylonitrile and Mannich bases.

One preferred embodiment comprises using as hardener a mixture of at least two hardeners including at least one hardener according to formula (I) or (II). Here, the proportion of hardener according to formula (I) or (II) in the mixture of at least two hardeners is, in order of increasing preference, at least 10, 20, 30, 40, 50, 60, 70, 80, 90 or 95 wt %.

DE102010030991.5 describes one preparative organic synthesis route to compounds of formula (I) and (II). These compounds are also obtainable biotechnologically by oxidation of corresponding cyclic alcohols by suitable oxidases followed by transamination by transaminases. A useful method is described in EP11170011.8 for example.

In accordance with the invention, useful epoxy resins include all epoxy resins curable with amines. The epoxy resins include, for example, polyepoxides based on bisphenol A diglycidyl ether, bisphenol F diglycidyl ether or cycloaliphatic types, for example 3,4-epoxycyclohexylepoxymethane or 3,4-epoxycyclohexylmethyl 3,4-epoxycyclohexanecarboxylate.

The curable composition according to the invention preferably comprises an epoxy resin selected from the group comprising epoxy resins based on bisphenol A diglycidyl ether, epoxy resins based on bisphenol F diglycidyl ether and cycloaliphatic types, for example 3,4-epoxycyclohexylepoxyethane or 3,4-epoxycyclohexylmethyl 3,4-epoxycyclohexanecarboxylate, particular preference being given to bisphenol A-based epoxy resins and to bisphenol F-based epoxy resins. Such compounds are commercially available.

It is essential for carrying out the teaching according to the invention to adhere to a certain ratio of the entirety of the epoxy resins to the entirety of the hardeners. In a preferred embodiment, the ratio is a stoichiometric ratio. In a more preferred embodiment, the stoichiometric ratio of the entirety of the epoxy resins in the composition to the entirety of the hardeners in the composition is from 1:0.7 to 1:1.3, yet more preferably from 1:0.9 to 1:1.1 and most preferably 1:1.

Prior art curable compositions comprising epoxy resin and amine hardeners generally comprise a modifier, usually benzyl alcohol. Modifiers such as benzyl alcohol can be used to adjust the binder properties such as through-curing, flow and the resin-hardener mixture ratio. One particular advantage of the teaching according to the invention is that the quantity of benzyl alcohol employed as modifier may be reduced or the modifier, preferably the benzyl alcohol, may be omitted completely without sacrificing the entirety of the processing-relevant properties. In one preferred embodiment, the composition comprises, in order of increasing preference, less than 20 g, 15 g, 10 g, 5 g or 1 g of benzyl alcohol per 100 g of the entirety of all hardeners comprised therein. In a further preferred embodiment, the composition comprises, in order of increasing preference less than 10, 8, 6, 4, 3, 2, 1 or 0.5 wt % of benzyl alcohol. In a most preferred embodiment, the quantity of benzyl alcohol in the composition according to the invention is undetectable.

In one preferred embodiment, the curable composition according to the invention comprises at least one reactive diluent. In one preferred embodiment, the term "reactive diluent" as used herein is to be understood as meaning a low-viscosity epoxy-containing compound which is compatible with epoxy resin and hardener and which provides optimal dilution. The reactive diluent is preferably selected from the group of mono- bi- or polyfunctional epoxy compounds liquid at room temperature, for example butyl glycidyl ether, phenyl glycidyl ether, glycidyl ether of versatic acid, C12-C14 glycidyl ethers, C13-C15 glycidyl ethers, p-tert-butylphenyl glycidyl ether, 1,6-hexane diglycidyl ether, 1,4-butane diglycidyl ether, neopentyl glycol diglycidyl ether, glycerol triglycidyl ether, pentaerythritol polyglycidyl ether, trimethylolpropane triglycidyl ether and cresyl glycidyl ether.

In a further preferred embodiment, the curable composition according to the invention comprises at least one reaction accelerant, preferably selected from the group consisting of organic acids and tertiary amines, for example salicylic acid, aminoethylpiperazine, tris(N,N-dimethylaminomethyl)phenol.

In a further preferred embodiment, the curable composition according to the invention comprises at least one solvent, for example xylene or isopropanol.

In a further preferred embodiment, the curable composition according to the invention comprises pigments, fillers and/or additives.

The present invention is more particularly described by the following figures and non-limiting examples from which further features, embodiments, aspects and advantages of the present invention may be discerned.

EXAMPLE: PREPARATION OF A CURABLE COMPOSITION ACCORDING TO THE INVENTION AND A CURABLE COMPOSITION DESCRIBED IN THE PRIOR ART AND COMPARISON OF THE PROCESSING-RELEVANT PROPERTIES THEREOF

The example which follows shows results compared to isophoronediamine (IPD) which is an amine regarded as industry standard, for example for epoxy resin-based industrial flooring. All components were thoroughly commixed with one another for processing and testing.

TABLE 1

Room temperature curing of HMF diamine versus isophoronediamine

|  | IPD-based with benzyl alcohol | IPD-based without benzyl alcohol | HMF diamine-based |
|---|---|---|---|
| Formulation components (in g) | | | |
| Isophoronediamine (IPD) | 42.6 | 42.6 | |
| 5-Aminomethyl-2-furfurylamine (HMF diamine) | | | 31.5 |
| Benzyl alcohol | 37.5 | — | — |
| Epoxy resin (standard bisphenol A-based resin; for example Epikote 828) | 188 | 188 | 188 |
| Properties | | | |
| Initial viscosity at 23° C. [mPa*s]; DIN 53019 | 1200 | 2400 | 1500 |
| Peak temperature, 100 g batch [° C.] | 40 | 30 | 175 |
| Time to max. peak temperature [min] | 80 | 215 | 140 |
| Gel time at 23° C. [min] 100 g batch in water bath | 65 | about 240 | 130 |
| Tests after curing at 23° C., 50% rel. humidity | | | |
| Conversion after 7 days (DSC; DIN EN ISO 11357-1) | 93% | 72% | 85% |
| Tg after 7 days (DSC; DIN EN ISO 11357-1) | 49° C. | 51° C. | 51° C. |
| Heat deflection temperature [° C.] after 1 day DIN EN ISO 75 | brittle | brittle | brittle |
| Heat deflection temperature [° C.] after 2 days DIN EN ISO 75 | 48° C. | brittle | 48° C. |
| Heat deflection temperature [° C.] after 7 days DIN EIN ISO 75 | 54° C. | brittle | 51° C. |
| Shore D hardness after 1 day DIN EN ISO 868 | brittle | brittle | brittle |
| Shore D hardness after 2 days DIN EN ISO 868 | 80 | brittle | 83 |
| Shore D hardness after 7 days DIN EN ISO 868 | 82 | brittle | 83 |
| Visual surface appearance | OK | OK | OK |

Results:

The IPD-based formulation requires benzyl alcohol to achieve a sufficient conversion.

Using HMF diamine makes it possible to achieve conversions after 7 days of about 85% without using modifiers such as benzyl alcohol. This is within a range usually acceptable in practice.

Compared to the IPD-based formulation without benzyl alcohol, the HMF diamine-based curable epoxy-based composition has a distinctly lower viscosity and is more reactive.

Using HMF diamine as hardener in place of IPD achieves good through-curing (heat deflection temperatures, Shore hardnesses) even without using benzyl alcohol.

Coatings having good surface qualities are obtainable.

The invention claimed is:

1. A curable composition, comprising:
an epoxy resin and
a hardener,
wherein the hardener is a compound of formula (I) or (II)

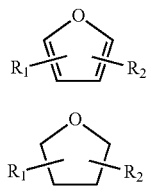

where $R_1$ and $R_2$ are each independently a substituent having formula —$(CH_2)_x$—$NH_2$ and x is in each case independently a number of 0, 1, 2, 3 or 4.

2. The composition according to claim 1, wherein x in $R_1$ and $R_2$ is 1.

3. The composition according to claim 1, wherein the hardener is 5-aminomethyl-2-furfurylamine.

4. The composition according to claim 1, wherein the epoxy resin is an epoxy resin based on bisphenol A diglycidyl ether, bisphenol F diglycidyl ether, and cycloaliphatic resins.

5. The composition according to claim 1, which comprises less than 20 g of benzyl alcohol per 100 g of total hardeners comprised therein.

6. The composition according to claim 1, which comprises less than 4 wt % of benzyl alcohol.

7. The composition according to claim 1, which comprises no benzyl alcohol.

8. The composition according to claim 1, wherein a stoichiometric ratio of a total amount of the epoxy resin to a total amount of the hardener is from 0.7 to 1.3.

9. The composition according to claim 8, wherein the stoichiometric ratio of the total amount of the epoxy resin to the total amount of the hardener is from 0.9 to 1.1.

10. The composition according to claim 1, further comprising: a second hardener comprising at least two or more primary and/or secondary amine groups.

11. The composition according to claim 1, further comprising: a reaction accelerant.

12. The composition according to claim 1, further comprising: a reactive diluent.

13. The composition according to claim 1, further comprising pigments, fillers and/or additives.

14. A surface, which is coated with the composition according to claim 1.

15. A method of coating a surface, the method comprising applying to the surface a coating material comprising the composition according to claim 1.

16. The method according to claim 15, wherein the surface is a surface comprising metal, mineral substrate, plastic, paint/varnish, polymer concrete, adhesive, fibre composite, potting composition or an impregnation.

17. A surface protection on a surface or an impregnation, comprising: the composition according to claim 1,
wherein the surface comprises metal, mineral substrate, plastic, paint/varnish, polymer concrete, adhesive, fibre composite, or potting composition.

18. A composition obtained by a process comprising: curing the composition according to claim 1.

19. The composition according to claim 10, wherein the second hardener is selected from the group consisting of methylenedianiline, N-aminoethylpiperazine, isophoronediamine, m-phenylenebis(methylamine), 1,3- and/or 1,4-bis(aminomethyl)cyclohexane, trimethylhexamethylenediamine, a polyoxyalkyleneamine, a polyaminoamide, and a reaction product of an amine with acrylonitrile and a Mannich base.

* * * * *